(12) United States Patent
Majeed et al.

(10) Patent No.: US 10,477,886 B2
(45) Date of Patent: Nov. 19, 2019

(54) FUNCTIONAL NUTRITIONAL BLEND FOR THERMO-METABOLIC PERFORMANCE

(71) Applicants: Muhammed Majeed, Edison, NJ (US); Kalyanam Nagabhushanam, East Windsor, NJ (US); Mitchell Chavez, East Windsor, NJ (US)

(72) Inventors: Muhammed Majeed, Edison, NJ (US); Kalyanam Nagabhushanam, East Windsor, NJ (US); Mitchell Chavez, East Windsor, NJ (US)

(73) Assignee: SAMI LABS LIMITED, Bangalore (IN)

( * ) Notice: Subject to any disclaimer, the term of this patent is extended or adjusted under 35 U.S.C. 154(b) by 0 days.

(21) Appl. No.: 16/281,125

(22) Filed: Feb. 21, 2019

(65) Prior Publication Data

US 2019/0174810 A1 Jun. 13, 2019

Related U.S. Application Data

(62) Division of application No. 15/599,805, filed on May 19, 2017, now Pat. No. 10,258,073.

(60) Provisional application No. 62/339,110, filed on May 20, 2016.

(51) Int. Cl.
*A61K 36/00* (2006.01)
*A23L 33/105* (2016.01)

(52) U.S. Cl.
CPC ......... *A23L 33/105* (2016.08); *A23V 2002/00* (2013.01)

(58) Field of Classification Search
CPC ...................................................... A61K 36/00
USPC ............................................................ 424/725
See application file for complete search history.

(56) References Cited

U.S. PATENT DOCUMENTS 8,377,473 B2 * 2/2013 Liu ..................... A61K 31/191
420/402

* cited by examiner

*Primary Examiner* — Michael V Meller

(57) ABSTRACT

The present invention discloses a functional nutritional blend comprising *Gynostemma pentaphyllum* extract, *Coleus forskohlii* extract, *Zingiber officinale* extract and *Piperine* (Bioperine®), for increasing metabolic efficiency and inhibition of adipogenesis.

1 Claim, 2 Drawing Sheets

FUNCTIONAL NUTRITIONAL BLEND FOR THERMO-METABOLIC PERFORMANCE

CROSS-REFERENCE TO RELATED APPLICATIONS

This application is divisional of U.S. complete application Ser. No. 15/599,805 filed on 19 May 2017 claiming priority from U.S. provisional application No. 62/339,110 filed on 20 May 2016.

FIELD OF THE INVENTION

The invention in general relates to plant based dietary supplements. More specifically, the invention relates to plant based nutritional composition comprising powdered extract or raw plant powder of *Gynostemma pentaphyllum, Coleus forskohlii, Zingiber officinale* and *Piperine*, for maximizing metabolic efficiency.

BACKGROUND OF THE INVENTION

Description of Prior Art

Recently, much emphasis is being given for the improvement of metabolic efficiency and energy homeostasis in many disorders, especially in the realm of metabolic syndrome and dyslipidemia. The intracellular second messenger—3'-5'-Cyclic adenosine monophosphate (cyclic AMP or cAMP) is well known to be a versatile molecular signal involved in both central and peripheral regulation of energy homeostasis and nutrient partitioning (Ravnskjaer K, Madiraju A, Montminy M, Role of the cAMP Pathway in Glucose and Lipid Metabolism. Handb Exp Pharmacol. 2016; 233: 29-49). The relationship between the secondary messenger cAMP and AMPK (AMP-activated protein kinase), is also well established. AMPK is considered the master regulator of cellular energy and the key enzyme regulating fatty acid oxidation, ketogenesis, inhibition of cholesterol and triglyceride synthesis, and overall lipogenesis. It is well known in the scientific literature that increasing the levels of cAMP lead to the increased activation of AMPK thereby improving the overall energy homeostasis by increasing the metabolic efficiency.

Pharmaceutical actives capable of increasing cAMP levels are being effectively designed to improve the metabolic efficiency. Owing to lesser side effects, increased safety and efficacy, actives derived from plant based natural sources are being screened and evaluated for their ability to increase cAMP concentrations. Although, Forskolin, a labdane diterpenoid isolated from *Coleus forskohlii* is a well known cAMP activator (Alasbahi R H, Melzig M F. Forskolin and derivatives as tools for studying the role of cAMP. Pharmazie. 2012 January; 67(1):5-13), a comprehensive nutritional blend derived from plant based sources, with low cost and high efficacy is warranted for improving the thermo-metabolic performance. The present invention solves once such problem by disclosing a functional nutritional blend from different plant sources for the improvement of metabolic efficiency.

It is the principle objective of the present invention to disclose a functional nutritional composition comprising powdered extract or raw plant powder of *Gynostemma pentaphyllum, Coleus forskohlii, Zingiber officinale* and *Piperine* (Bioperine®), for maximizing calorie burn and promoting metabolic efficiency by increasing the levels of cAMP.

It is also another objective of the present invention to disclose the adipogenesis inhibition potential of the nutritional composition comprising powdered extract or raw plant powder of *Gynostemma pentaphyllum, Coleus forskohlii, Zingiber officinale* and *Piperine* (Bioperine®).

The present invention fulfils the aforesaid objectives and provides further related advantages.

SUMMARY OF THE INVENTION

The present invention discloses a functional nutritional blend comprising 70-73% w/w *Gynostemma pentaphyllum* extract. 12-15% w/w *Coleus forskohlii* extract (20% w/w), 10-12% w/w *Zingiber officinale* extract and 0.5-1% w/w *Piperine* (Bioperine®), for increasing metabolic efficiency and inhibition of adipogenesis.

Other features and advantages of the present invention will become apparent from the following more detailed description, taken in conjunction with the accompanying images, which illustrate, by way of example, the principle of the invention.

DESCRIPTION OF THE MOST PREFERRED EMBODIMENTS

Figure 1:
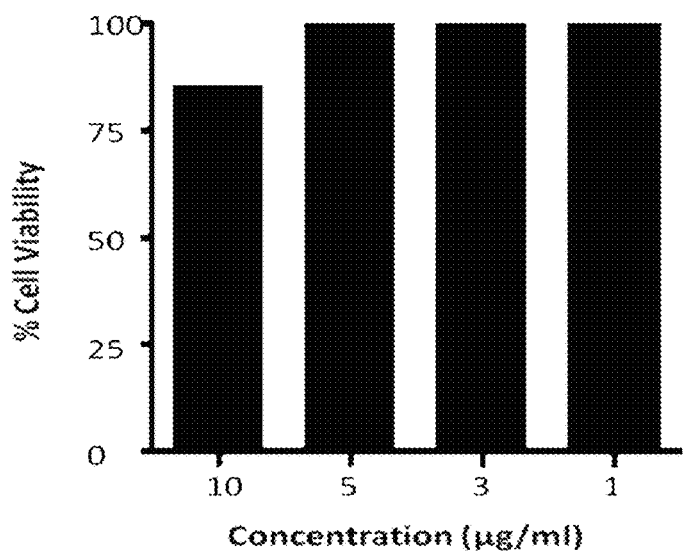
FIG. 1 shows the graphical representation of viability of Mouse 3T3-L1 pre adipocytes incubated with different concentrations of the functional nutritional blend—Metabolicgard (GP34).

In the most preferred embodiment, the present invention discloses a composition comprising 70-73% w/w *Gynostemma pentaphyllum* extract, 12-15% w/w *Coleus forskohlii* extract (20% w/w), 10-12% w/w *Zingiber officinale* extract and 0.5-1% w/w *Piperine* (Bioperine®) for use in promoting metabolic efficiency in mammals by increasing the levels of cAMP. In a related embodiment, the invention discloses a method of promoting metabolic efficiency by increasing the levels of cAMP in mammals, said method comprising step of administering effective dose of composition comprising 70-73% w/w *Gynostemma pentaphyllum* extract, 12-15% w/w *Coleus forskohlii* extract (20% w/w), 10-12% w/w *Zingiber officinale* extract and 0.5-1% w/w *Piperine* (Bioperine®) to said mammals.

In another most preferred embodiment, the invention discloses a method of adipogenesis inhibition, said method comprising steps of bringing into contact mammalian adipocytes with an effective concentration of a composition comprising 70-73% w/w *Gynostemma pentaphyllum* extract, 12-15% waw *Coleus forskohlii* extract (20% w/w), 10-12% w/w *Zingiber officinale* extract and 0.5-1% w/w *Piperine* (Bioperine®), for adipogenesis inhibition.

The specific examples included herein below illustrate the aforesaid most preferred embodiments of the present invention.

Example I

Method of Preparing Plant Extracts and Preparation of Nutritional Blend

*Gynostemma pentaphyllum* Extract

*Gynostemma pentaphyllum* leaves were collected from local market and milled to a coarse powder. The powder was extracted with methanol to yield a paste which was further purified using a Tulsion Resin Column to yield a light brown colour powder extract. The powdered extract was stored for further use.

*Coleus forskohlii* Extract

The roots of *Coleus forskohlii* were dried and milled to a coarse powder. The powder was extracted with toluene to obtain a concentrated extract containing 10-12% Forskolin. The extract was further treated with n-hexane, chilled and then filtered through Whatman filter no 1 paper and dried to obtain a paste containing 30-40% forskolin. The pasted was then dissolved in ethanol and dried. Further, the dried pasted was diluted with food grade maltodextrin (40 to 45%) and milled to a coarse powder. The magnetic particles if present were separated and the powdered extract was stored for further use.

*Zingiber officinale* Extract

The dry *Zingiber officinale* rhizomes were physically cleaned and pulverised to 10-20 mesh to obtain a coarse powder. The powder was then subjected to supercritical carbon-dioxide extraction resulting in 2 separate fractions 1. Ginger oleoresin and 2. Ginger oil. The aq. ginger oleoresin fraction was dehydrated under high vacuum at below 50° C. and the resulting oleoresin was formulated by the addition of 25-30% Magnesium carbonate, 10-15% Magnesium oxide, 20-25% Starch, 15-20% Maltodextrin and 2-5% talc. The formulation was dried to a free flowing powder. The powder was further milled and subjected to sifting through 40 mesh to obtain a 5% dry ginger extract (Gingerol). The extract was stored for further use.

Piperine

Piperine was procured from a commercial source (Bioperine®, from Sabinsa Corporation, USA)

Sample Preparation:

Stock solutions of the extracts were prepared in DMSO and diluted in cell culture media to get the final desired concentrations. DMSO concentrations were maintained below 0.5%. The composition of the Metabolicgard (GP34) blend was prepared as in Table 1.

TABLE 1

Composition of Metabolicgard GP34 Blend

| Batch No | *Gynostemma pentaphyllum* extract | *Coleus forskohlii* extract (20%) | Dry ginger (SCF) extract | Bioperine | Total quantity |
|---|---|---|---|---|---|
| RD/GP-H/34 | 4.8 gm | 1.0 gm | 0.8 gm | 40 mg | 6.64 gm |
| Percentage in the Blend | 72.29% | 15.06% | 12.05% | 0.6% | 100% |

Example 2—Estimation of cAMP Levels and Adipogenesis Inhibition

Cell Culture:

Mouse immortalised 3T3-L1 pre adipocytes were cultured in 5% CO2 at 37° C. in growth media consisting of Dulbecco's Modified Eagles Medium (DMEM) containing 10% heat-inactivated foetal calf serum with 40 µg/mL of gentamycin. $5 \times 10^3$ cells were seeded per well in a 96 well plate and allowed to grow as a confluent monolayer.

Cell Viability:

The viability of 3T3-L1 pre adipocytes in the presence of the different plant extracts individually and in the presence of Metabolicgard (GP34) was assessed by Sulforhodamine B (SRB) assay. The SRB assay is based on binding of the dye to basic amino acids of cellular proteins, and colorimetric evaluation provides an estimate of total protein mass, which is related to cell number. The advantages of this test as compared to other tests include better linearity, higher sensitivity, a stable end point. Mouse 3T3-L1 pre adipocytes were cultured in DMEM containing 10% heat-inactivated foetal calf serum. 5000 cells were seeded in 96 well culture plates and allowed to form adhere and form a monolayer. Test compounds were added at different concentrations and incubated for 72 hours at 37° C. and 5% CO2. Cells were fixed using 10% trichloroacetic acid (TCA) solution at 4° C. for one hour. SRB solution (0.4%) was added to the wells and incubated for 30 minutes at room temperature. Excess dye was washed 5 times with 1% acetic acid. 100 µl of 10 mM trizma base was added to the wells to solubilize the SRB. Absorbance was read using a microplate reader at a wave length of 492 nm. The absorbance of cells with growth media was considered as 100% viable and percentage viability was calculated based on this reading. The results indicated that the 100% viability was achieved when 3T3-L1 pre adipocytes were incubated with the nutritional blend Metabolicgard (GP34) at 5 µg/ml (FIG. 1). The non-toxic concentrations of the nutritional blend and the individual plant extracts are mentioned herein below in Table 2.

TABLE 2

Cell viability at different concentrations of the natural extracts

| Extracts | Non-toxic concentration |
|---|---|
| *Gynostemma* extract | 25 µg/ml |
| 20% *Coleus Forskohli* extract- | 25 µg/ml |
| Dry Ginger (Gingerol 5%) | 12.5 µg/ml |
| Bioperine | 25 µg/ml |
| Metabolicgard GP 34 blend | 5 µg/ml |

Adipogenesis Inhibition Activity In Vitro

Figure 2:
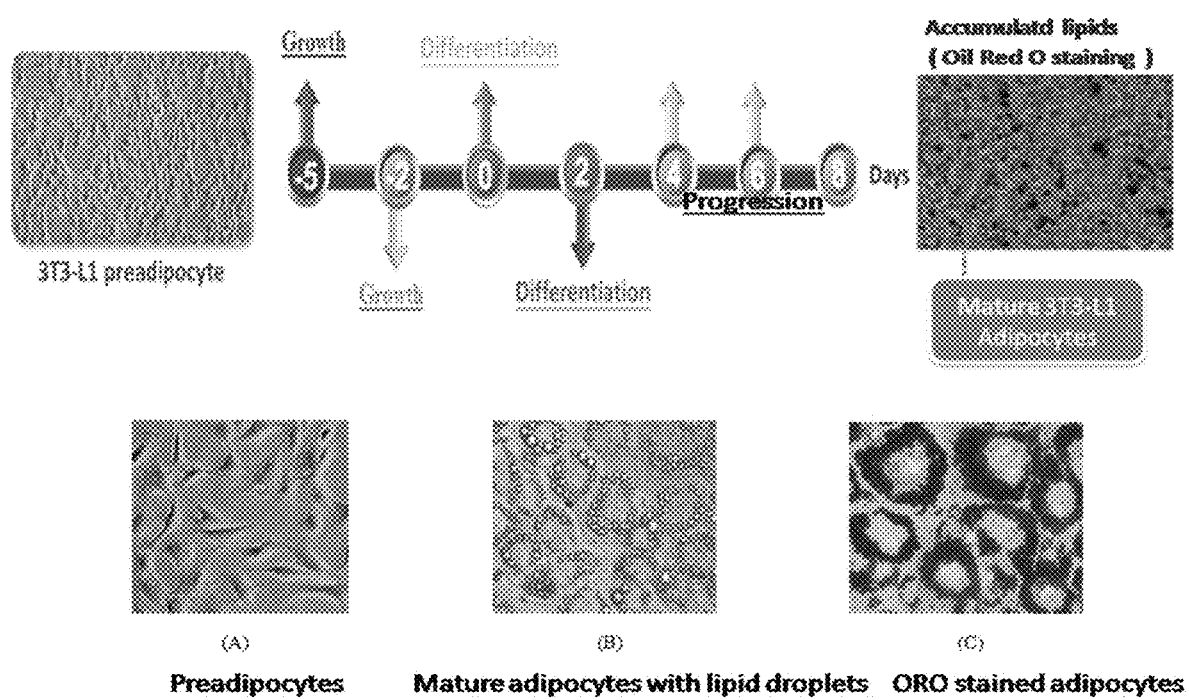
FIG. 2 shows the overview of the in-vitro adipogenesis.

3T3-L1 pre adipocytes were allowed to grow as a confluent monolayer. Two days post-confluency (day0), the cells were induced to differentiate by supplementing DMEM media containing 10% Fetal Bovine Serum (FBS) along with 1 µg/mL insulin, 0.25 µM dexamethasone, 0.5 mM 1-methyl-3-isobutyl-xanthine (IBMX) with or without the test samples. Pre adipocytes were allowed to differentiate for 48 hours following which the cells were grown in a progression media containing 1 µg/mL insulin and the samples, with media change every 48 hours for 7 days. Cells without sample treatment and undifferentiated cells grown in FCS media were taken as controls for the experiment. After $3^{rd}$ progression, on day 8, the cells were taken for Oil Red O (ORO) staining to estimate the intracellular lipid content. The overall adipogenesis mechanism is illustrated in FIG. 2

ORO Staining Protocol:

The main stock of ORO dye was prepared by dissolving 0.5 g ORO in 100 ml isopropyl alcohol (IPA). The main stock was diluted with distilled water in 3:2 ratio and sonicated for 30 min and kept at 4'C for 30 min. It was then centrifuged at 5000 rpm for 30 min and the supernatant was filtered with 0.2 micron filter to obtain the ORO working stock. The media was removed from each well of the 96 well plate and wells were gently washed with 200 µl PBS. 100 µl of 10% formalin was added to each well and incubated at RT for 30 min. The wells were then washed two times with 60% IPA and 100 µl of clear working solution of ORO was added to each well and incubated at RT for 1 hr. The ORO was tapped off and wells were washed twice with 70% ethanol (in PBS) followed by PBS and air dried. 100 μl of 4% tritonX-100 (made up in IPA) was added to each well and incubated for 20 min at 25-30° C. with gentle shaking. The absorbance was read at 492 nm.

Figure 3:
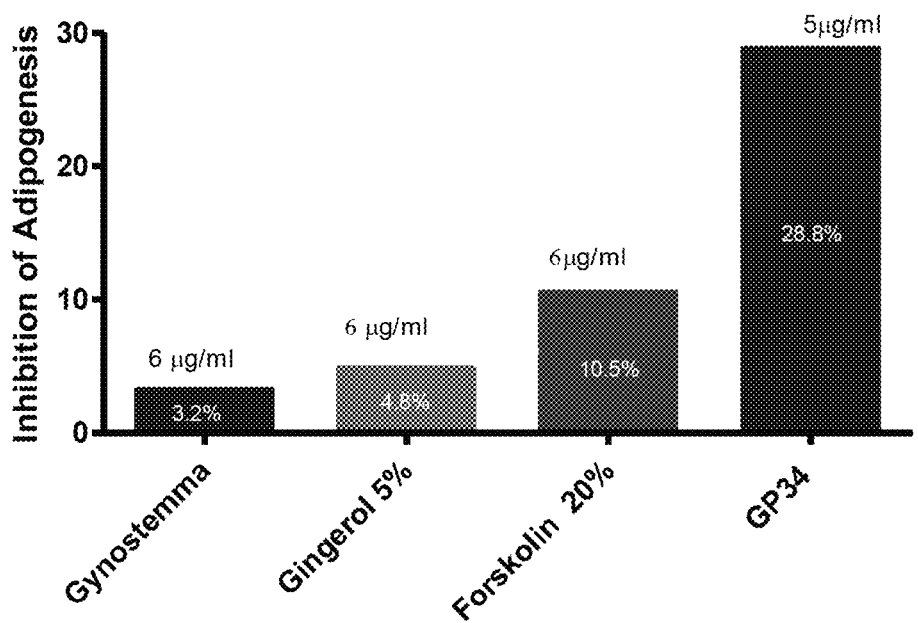
FIG. 3 is the graphical representation of inhibition of adipogenesis in-vitro by the functional nutritional blend—Metabolicgard (GP34) and the individual components of the blend.
Figure 3:
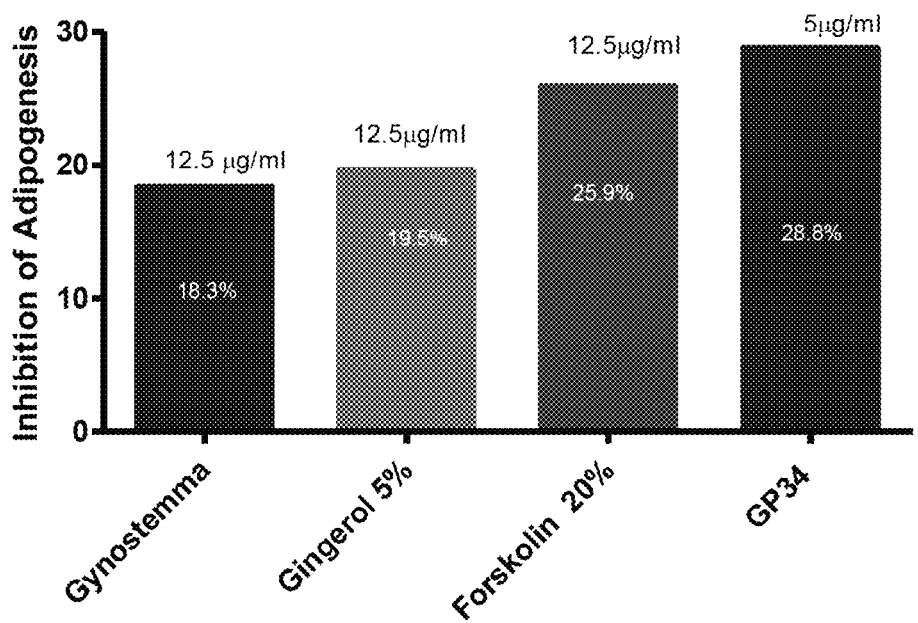

The adipogenesis inhibition was tested for the individual extracts separately and for the nutritional blend. The results indicated that at concentrations of 6 μg/ml, the adipogenesis inhibition of the individual plant extracts was observed to be 3.2% for *Gynostemma pentaphyllum* extract, 10.5% for *Coleus forskohlii* extract and 4.4% for *Zingiber officinale* extract (Table 3). However, at a lower concentration of 5 μg/ml the nutritional blend Metabolicgard (GP34) showed improved inhibition of adipogenesis at 28.8% (FIG. 3), indicating the superior adipogeneis inhibition potential of the blend when compared to the individual plant extracts.

TABLE 3

In vitro inhibition of adipogenesis by individual components of the blend

| Extract | Concentration (μg/ml) | Inhibition of adipogenesis |
|---|---|---|
| *Gynostemma* | 12 | 18.4% |
|  | 6 | 3.2% |
| Dry Ginger 5% | 12 | 19.6% |
|  | 6 | 4.4% |
| Forskolin 20% | 12 | 25.9% |
|  | 6 | 10.5% |

Estimation of cAMP Levels:

Adipocyte differentiation was carried out as mentioned earlier. Differentiated adipocytes were maintained in progression media containing 1 μg/mL insulin along with the test samples for 48 hours. The media was removed and cells were washed once with PBS and lysed using RIPA buffer at 4° C. The lysate was centrifuged and the supernatant was used for the estimation of cAMP by ELISA (Direct cAMP ELISA Kit, Enzo Life Sciences, NY)

The results indicated that the nutritional blend GP34 showed 85.04% increase in the cAMP levels when compared to control, whereas forskolin (20%) increased cAMP levels at 71.5%. (Table 4). Thus, the GP34 nutritional blend is a superior activator of cAMP compared to forskolin which is a well known cAMP activator.

TABLE 4

Levles of cAMP in adipocytes

| Samples | Concentration | cAMP levels (pg/ml) | Percentage increase |
|---|---|---|---|
| Control |  | 0.25 | — |
| GP 34 | 5 μg/ml | 1.64 | 85.04% |
| Forskolin | 12.5 μg/ml | 1.37 | 71.5% |

Overall, the results indicated that the functional nutritional blend GP34 containing *Gynostemma pentaphyllum* extract, 20% Forskolin, 5% dry ginger extract and Bioperine® showed inhibition of adipogenesis by 28.8% in vitro and increased cAMP levels in adipocytes by 85.04%. The invention has potential applications in, but not limited to, weight management, satiety, metabolic syndrome, sports and human performance, dyslipidemia, mental concentration and hypertension management.

While the invention has been described with reference to a preferred embodiment, it is to be clearly understood by those skilled in the art that the invention is not limited thereto. Rather, the scope of the invention is to be interpreted only in conjunction with the appended claims.

We claim:

1. A composition for inhibiting adipogenesis in mammalian adipocytes consisting essentially of 70-73% w/w *Gynostemma pentaphyllum* extract, 12-15% w/w *Coleus forskohlii* extract, 10-12% w/w *Zingiber officinale* extract and 0.5-1% w/w *Piperine*.

* * * * *